United States Patent [19]

Clark

[11] 3,928,309
[45] Dec. 23, 1975

[54] CATIONIC DYES FROM 5-AMINOIMIDAZO-(1,2-A)-PYRIDINES

[75] Inventor: Gary T. Clark, Kingsport, Tenn.

[73] Assignee: Eastman Kodak Company, Rochester, N.Y.

[22] Filed: July 15, 1974

[21] Appl. No.: 488,350

[52] U.S. Cl. ......... 260/146 R; 260/155; 260/295 F; 260/296 B
[51] Int. Cl.². ... C09B 29/36; D06P 3/24; D06P 3/52
[58] Field of Search .......................... 260/155, 146 R

[56] References Cited
UNITED STATES PATENTS

| | | | |
|---|---|---|---|
| 3,562,245 | 2/1971 | Mohr et al. | 260/146 |
| 3,804,823 | 4/1974 | Fisher et al. | 260/158 |

Primary Examiner—Floyd D. Higel
Assistant Examiner—John J. Doll
Attorney, Agent, or Firm—Elliott Stern; Daniel B. Reece, III

[57] ABSTRACT

Dyestuffs of the formula

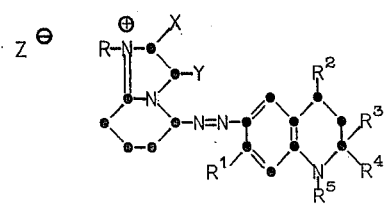

wherein

R is lower alkyl or benzyl;

$R^1$ is hydrogen, lower alkyl, lower alkoxy, formamido, acetamino or benzamido;

$R^2$, $R^3$ and $R^4$ are the same or different and each represents hydrogen or methyl with the proviso that when $R^2$ is methyl then $R^3$ and $R^4$ are methyl and when $R^2$ is hydrogen only one of $R^3$ and $R^4$ may be methyl; $R^5$ is lower alkyl or lower alkyl substituted with chloro, hydroxy, acetoxy, methoxy, acetamido, cyano, succinimido or phthalimido;

X is hydrogen or lower alkyl;

Y is hydrogen, lower alkoxycarbonyl, lower alkyl or formyl; and

Z is a basic dye anion.

These dyes import bright colorfast blue shades to acrylic, modacrylic, acid-modified polyester and acid-modified polyamide fibers.

10 Claims, No Drawings

CATIONIC DYES FROM 5-AMINOIMIDAZO-(1,2-A)-PYRIDINES

This invention relates to cationic dyes from 5-aminoimidazo[1,2-a]pyridine and tetrahydroquinone couplers, and to the use of such dyes for imparting bright, colorfast blue shades to acrylic, modacrylic, acid-modified polyester and acid-modified polyamide textile fibers, yarns, and fabrics.

The novel dyestuffs of this invention have the general formula

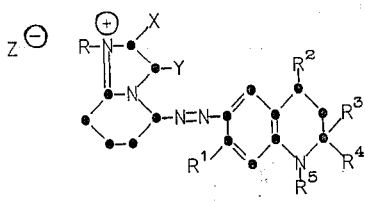

wherein
R is lower alkyl or benzyl;
$R^1$ is hydrogen, lower alkyl, lower alkoxy, formamido, acetamido or benzamido;
$R^2$, $R^3$ and $R^4$ are the same or different and each represents hydrogen or methyl with the proviso that when $R^2$ is methyl then $R^3$ and $R^4$ are methyl and when $R^2$ is hydrogen only one of $R^3$ and $R^4$ may be methyl; $R^5$ is lower alkyl or lower alkyl substituted with chloro, hydroxy, acetoxy, methoxy, acetamido, cyano, succinimido or phthalimido;
X is hydrogen or lower alkyl;
Y is hydrogen, lower alkoxycarbonyl, lower alkyl or formyl; and
Z is a basic dye anion.

As used herein to describe a substituent containing an alkyl radical, the term "lower" designates a carbon content of from 1 to about 6 carbon atoms.

Typical of the groups representative of R are ethyl, methyl, propyl, butyl, pentyl, isopropyl, benzyl, and the like. Typical of the groups representative of $R^1$ are hydrogen, ethyl, methyl, propyl, isopropyl, butyl, pentyl, methoxy, ethoxy, butoxy, isopropoxy, formamido, acetamido or benzamido. The substituents represented by $R^2$, $R^3$ and $R^4$ are hydrogen and methyl, with the proviso that when $R^2$ is methyl then $R^3$ and $R^4$ are methyl, and when $R^2$ is hydrogen only one of $R^3$ and $R^4$ may be methyl, the other being hydrogen. Typical of the groups representative of $R^5$ are methyl, ethyl, butyl, isobutyl, propyl, pentyl or any of these lower alkyl groups substituted with chloro, hydroxy, methoxy, acetoxy, acetamido, cyano, succinimido or phthalimido. Specific examples are chloroethyl, hydroxyethyl, methoxyethyl, etc. Typical of the groups represented by X are hydrogen, methyl, ethyl, propyl, butyl, etc. Typical of the groups representative of Y are hydrogen, methoxycarbonyl, ethoxycarbonyl, butoxycarbonyl, methyl, ethyl, propyl, and formyl. Typical of the anions represented by Z are

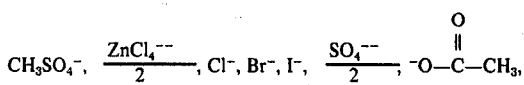

and $H_2PO_4^-$. It is pointed out that the anion does not affect the utility of the cationic portion of the compounds of the invention as dyes, nor does it affect the dye affinity of the cations for textile materials. Since the cation of a cationic dye is responsible for the color of the compound, the particular anion associated with the cation is not important.

In a preferred embodiment of this invention, R is methyl, ethyl, or benzyl; $R^1$ represents hydrogen, methoxy, benzamido, acetamido or methyl; $R^2$, $R^3$ and $R^4$ are all hydrogen or all methyl; $R^5$ is ethyl, ethyl substituted with chloro, acetamido, cyano, succinimido, or methoxy; X is hydrogen or methyl; Y is methoxycarbonyl, ethoxycarbonyl, methyl, ethyl, or formyl.

The dyes of this invention are prepared by the diazotization of the appropriately substituted 5-aminoimidazo[1,2-a]pyridine and subsequent coupling with the appropriate tetrahydroquinoline coupling component. The resulting dye may then be quaternized by treatment with an alkylating agent such as dimethyl sulfate in an inert solvent to give the cationic dye by proper work-up. These cationic dyes can then be dyed from an acidic bath on acrylic, modacrylic, basic dyeable polyester and basic dyeable polyamide fibers. The 5-aminoimidazo[1,2-a]pyridines and tetrahydroquinoline couplers useful in the preparation of the dyestuffs of this invention may be obtained commercially or according to known procedures. For example, 5-amino-3-carbethoxy-2-methylimidazo[1,2-a]pyridine and 5-amino-3-formylimidazo[1,2-a]pyridine may be prepared according to W. W. Paudler, R. A. Van Dahm, and Y. N. Park, *J. Hetero. Chem.*, 9, 81 (1972). 5-amino-2-methylimidazo[1,2-a]pyridine and 5-amino-2,3-dimethylimidazo[1,2-a]pyridine may be prepared according to J. P. Paolini and R. K. Robins, *J. Hetero. Chem.*, 2, 53 (1965). The tetrahydroquinoline couplers useful in the preparation of this invention are well known in the art and may be obtained commercially or prepared by methods described in the literature and well known to those skilled in the art. See for example U.S. Pat. No. 3,635,941. The method by which a coupled compound can be quaternized is well known to those skilled in the art. For example, the quaternized compound may be prepared by reacting the coupled dye with an alkylating agent in an inert solvent such as toluene. Suitable alkylating agents that can be used are the dialkyl sulfates, the alkyl halides, the aralkyl halides, the alkyl esters of arylsulfonic acids, etc. Examples of such alkylating agents include dimethyl sulfate, diethyl sulfate, ethyl bromide, methyl iodide, benzyl chloride, benzyl bromide, methyl p-toluene sulfonate, and ethylbenzene sulfonate.

The novel dyestuffs of this invention and their preparation are further illustrated by the following examples.

EXAMPLE 1

To a solution of 10.9 g. (0.05 mole) of 5-amino-3-carbethoxy-2-methylimidazo[1,2-a]pyridine in 75 ml. of trifluoroacetic acid is added a solution of 3.6 g. of $NaNO_2$ in 25 ml. of concentrated sulfuric acid and the solution is stirred at 0°–5°C. for 3 hours. A portion (0.005 mole) of the above solution is added with stirring to 0.005 mole of N-(2-hydroxyethyl)-2,2,4,7-tetramethyl-1,2,3,4-tetrahydroquinoline in 25 ml. of 1–5 (1 part propionic to 5 parts acetic acid) acid at 0°–10°C. The solution is neutralized to Congo red paper with ammonium acetate. After coupling is complete, the mixture is poured into ice/water and then made basic with concentrated ammonium hydroxide. The resulting dye is collected by filtration, washed with water and air-dried.

1a. The dye obtained from Example 1 is dissolved in 10 ml. of dimethylformamide and 2 ml. of dimethyl sulfate is added. The solution is heated on a steam bath for 1.5 hours and a solution of 5 ml. of isopropyl alcohol and 3 ml. of water is added and heating continued for 0.5 hour. Water, sodium chloride, and zinc chloride are added and the dye is collected by filtration, washed with 10% NaCl solution and air-dried to yield the following dye.

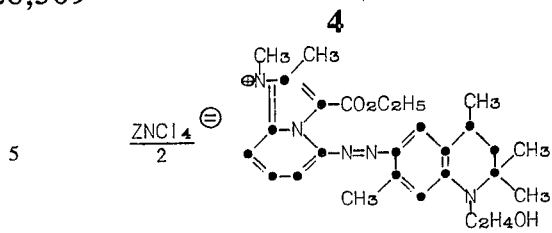

This dye imparts fast violet shades to acrylic, modacrylic, acid-modified polyester and acid-modified polyamide fibers. The examples in Table I are prepared in a manner similar to the above example.

Table I

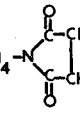

| Example | $R^1$ | $R^2$ | $R^3$ | $R^4$ | $R^5$ | X | Y | Z | Color |
|---|---|---|---|---|---|---|---|---|---|
| 2 | $CH_3$ | $CH_3$ | $CH_3$ | $CH_3$ | $C_2H_5$ | $CH_3$ | $CO_2C_2H_5$ | $\frac{ZNCl_4}{2}$ | Blue |
| 3 | H | $CH_3$ | $CH_3$ | $CH_3$ | $C_2H_5$ | $CH_3$ | $CO_2C_2H_5$ | $\frac{ZNCl_4}{2}$ | Blue |
| 4 | $OCH_3$ | $CH_3$ | $CH_3$ | $CH_3$ | $C_2H_5$ | $CH_3$ | $CO_2C_2H_5$ | $\frac{ZNCl_4}{2}$ | Blue |
| 5 | $OC_2H_5$ | $CH_3$ | $CH_3$ | $CH_3$ | $C_2H_5$ | $CH_3$ | $CO_2\,C_2H_5$ | $\frac{ZNCl_4}{2}$ | Blue |
| 6 | $NHCOCH_3$ | $CH_3$ | $CH_3$ | $CH_3$ | $C_2H_5$ | $CH_3$ | $CO_2C_2H_5$ | $\frac{NCl_4}{2}$ | Blue |
| 7 | $NHCOC_6H_5$ | $CH_3$ | $CH_3$ | $CH_3$ | $C_2H_5$ | $CH_3$ | $CO_2C_2H_5$ | $\frac{ZNCl_4}{2}$ | Blue |
| 8 | H | $CH_3$ | $CH_3$ | $CH_3$ | $C_2H_4Cl$ | $CH_3$ | $CO_2C_2H_5$ | $\frac{ZNCl_4}{2}$ | Blue |
| 9 | $CH_3$ | $CH_3$ | $CH_3$ | $CH_3$ | $C_2H_5$ | $CH_3$ | $CH_3$ | $\frac{ZNCl_4}{2}$ | Blue |
| 10 | $CH_3$ | $CH_3$ | $CH_3$ | $CH_3$ | $C_2H_5$ | H | CHO | $\frac{ZNCl_4}{2}$ | Blue |
| 11 | $CH_3$ | $CH_3$ | $CH_3$ | $CH_3$ | $C_2H_4\text{--O--}\overset{O}{\overset{\|}{C}}CH_3$ | $CH_3$ | $CO_2C_2H_5$ | $\frac{ZNCl_4}{2}$ | Blue |
| 12 | $CH_3$ | $CH_3$ | $CH_3$ | $CH_3$ | $C_2H_4CN$ | $CH_3$ | $CO_2C_2H_5$ | $\frac{ZNCl_4}{2}$ | Blue |
| 13 | $CH_3$ | $CH_3$ | $CH_3$ | $CH_3$ | $C_2H_4\text{-N(succinimido)}$ | $CH_3$ | $CO_2C_2H_5$ | $\frac{ZNCl_4}{2}$ | Blue |
| 14 | $CH_3$ | $CH_3$ | $CH_3$ | $CH_3$ | $C_2H_4OCH_3$ | $CH_3$ | $CO_2C_2H_5$ | $\frac{ZNCl_4}{2}$ | Blue |
| 15 | H | H | H | $CH_3$ | $C_2H_5$ | $CH_3$ | $CO_2C_2H_5$ | $\frac{ZNCl_4}{2}$ | Blue |
| 16 | $CH_3$ | H | H | H | $C_2H_5$ | $CH_3$ | $CO_2C_2H_5$ | $\frac{ZNCl_4}{2}$ | Blue |

Table I-continued

| Example | R¹ | R² | R³ | R⁴ | R⁵ | X | Y | Z | Color |
|---|---|---|---|---|---|---|---|---|---|
| 17 | $CH_3$ | H | H | H | $C_2H_4CN$ | $CH_3$ | $CO_2C_2H_5$ | $\frac{ZnCl_4}{2}$ | Blue |
| 18 | $CH_3$ | $CH_3$ | $CH_3$ | $CH_3$ | $C_2H_4-NH-\overset{\overset{O}{\|\|}}{C}-CH_3$ | $CH_3$ | $CO_2C_2H_5$ | $\frac{ZnCl_4}{2}$ | Blue |

The cationic monoazo compounds of this invention can be used for dyeing acrylic and modacrylic polymer fibers, yarns and fabrics. Acrylic textile materials are those which consist of at least 85 percent acrylonitrile, and modacrylic textile materials are those consisting of at least 35 percent but less than 85 percent acrylonitrile, and are well known in the art. Furthermore, the dyeing procedures for dyeing these fibers are also well known. The cationic compounds of the invention also give excellent dyeings on acid-modified acrylic textile materials such as the sulfonate-modified acrylic fibers described in U.S. Pats. 2,837,500; 2,837,501; and 3,043,811. The novel cationic compounds can also be used to dye sulfonate-modified polyester fibers such as are described in U.S. Pat. 3,018,272.

Although this invention has been described in detail with particular reference to preferred embodiments thereof, it will be understood that variations and modifications can be effected within the scope and spirit of the invention.

We claim:

1. Basic cationic dye having the formula

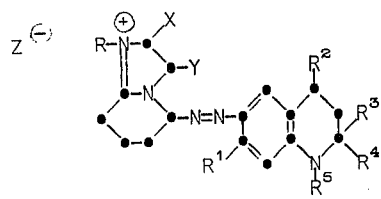

wherein
R is lower alkyl or benzyl;
R¹ is hydrogen, lower alkyl, lower alkoxy, formamido, acetamido, or benzamido;
R², R³ and R⁴ are the same or different and each represents hydrogen or methyl with the proviso that when R² is methyl then R³ and R⁴ are methyl and when R² is hydrogen only one of R³ and R⁴ may be methyl;
R⁵ is lower alkyl or lower alkyl substituted with chloro, hydroxy, acetoxy, methoxy, acetamido, cyano, succinimido or phthalimido;
X is hydrogen or lower alkyl;
Y is hydrogen, lower alkoxycarbonyl, lower alkyl or formyl; and
Z is a basic dye anion.

2. Basic dye of claim 1 wherein
R is methyl, ethyl or benzyl;
R¹ is hydrogen, methoxy, benzamido or acetamido;
R², R³ and R⁴ are the same and each represents hydrogen or methyl;
R⁵ is ethyl or ethyl substituted with chloro, acetamido, cyano, succinimido or methoxy;
X is hydrogen or methyl; and
Y is methoxycarbonyl, ethoxycarbonyl, methyl, ethyl or formyl.

3. Basic dye of claim 2 having the formula

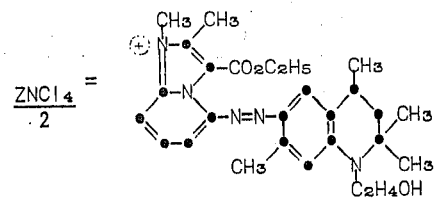

4. Basic dye of claim 2 having the formula

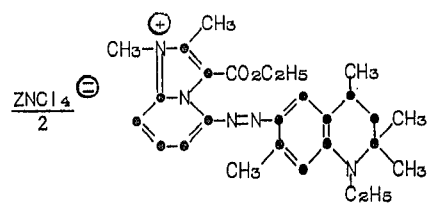

5. Basic dye of claim 2 having the formula

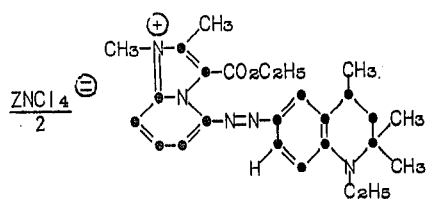

6. Basic dye of claim 2 having the formula

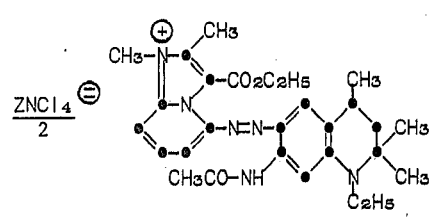

7. Basic dye of claim 2 having the formula
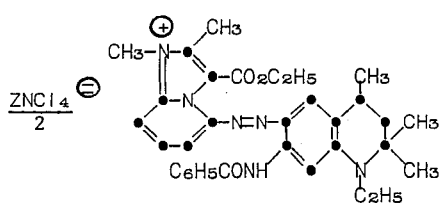
8. Basic dye of claim 2 having the formula
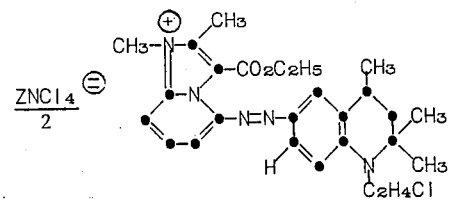
9. Basic dye of claim 2 having the formula
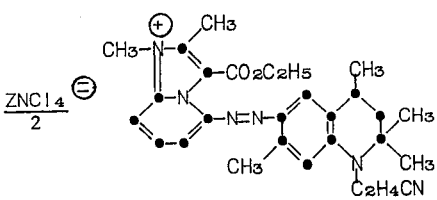
10. Basic dye of claim 2 having the formula
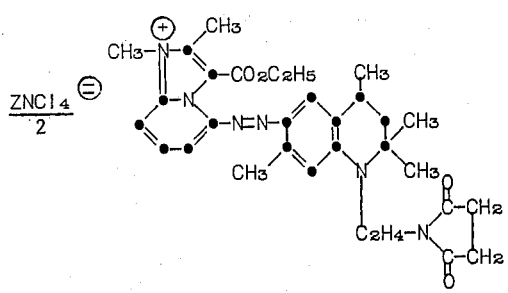
* * * * *